Aug. 11, 1942.　　K. G. ÖSTBERG　　2,292,470
ROTARY CLUTCHING DEVICE
Filed March 6, 1940　　4 Sheets-Sheet 1
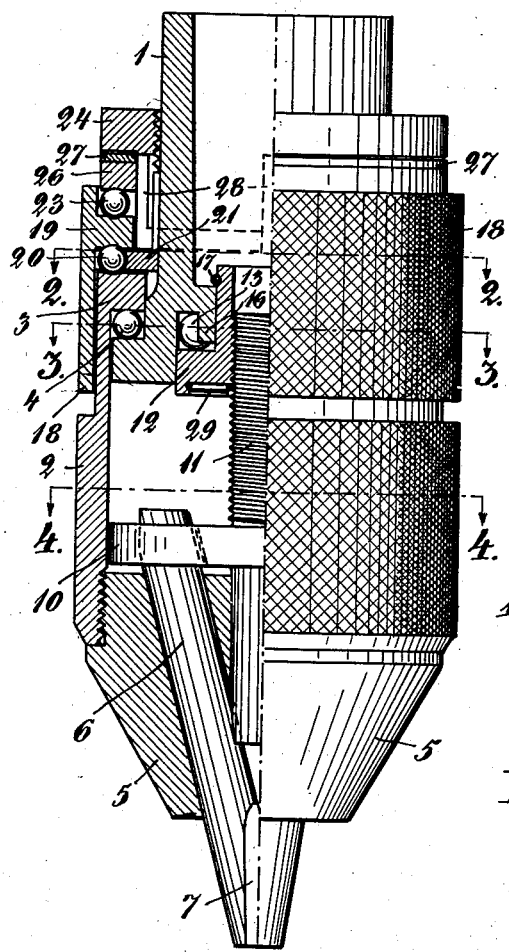
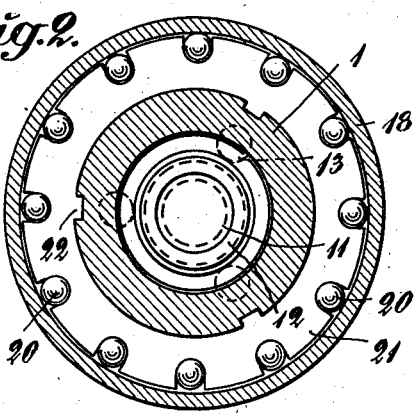
Inventor,
K. G. Östberg
By Glascock
Downing & Seebold
Attys.

Aug. 11, 1942.   K. G. ÖSTBERG   2,292,470
ROTARY CLUTCHING DEVICE
Filed March 6, 1940    4 Sheets-Sheet 2
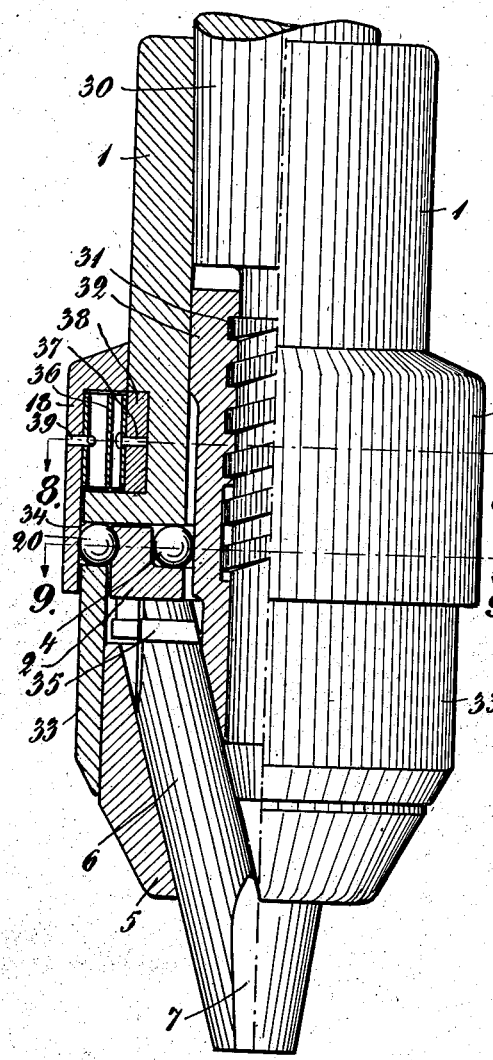
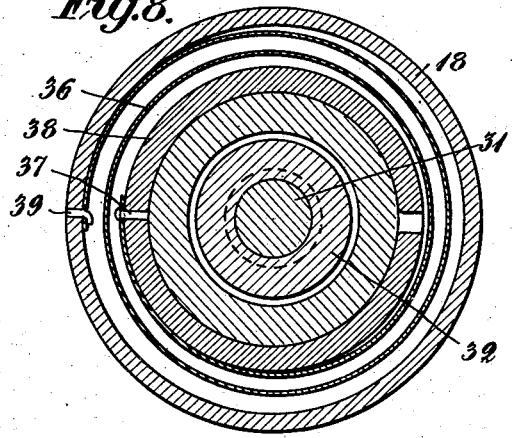
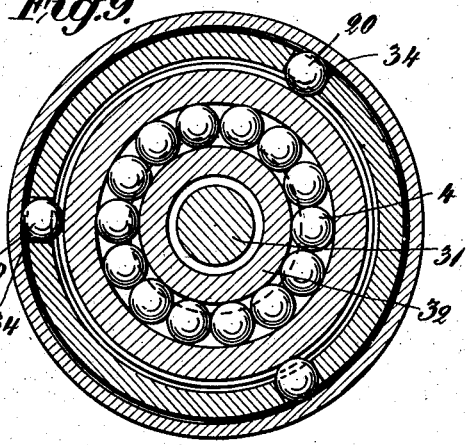
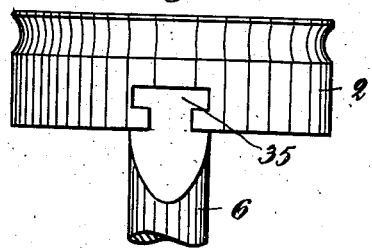
Inventor,
K. G. Östberg
By Glascock Downing & Seebold
Attys.

Aug. 11, 1942.   K. G. ÖSTBERG   2,292,470
ROTARY CLUTCHING DEVICE
Filed March 6, 1940   4 Sheets-Sheet 3
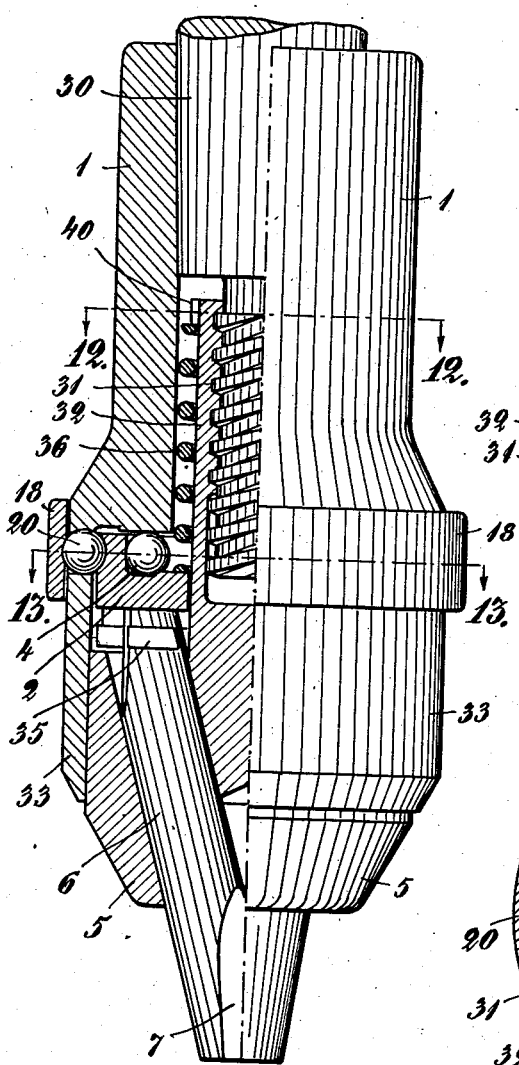
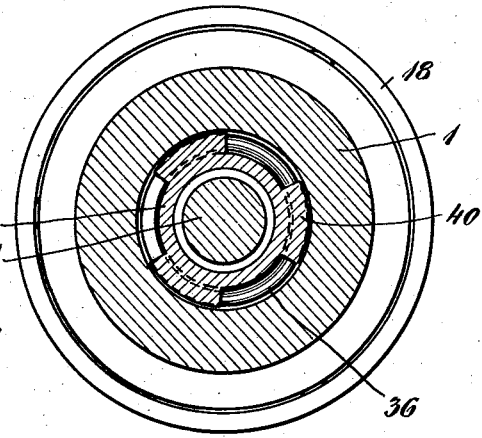
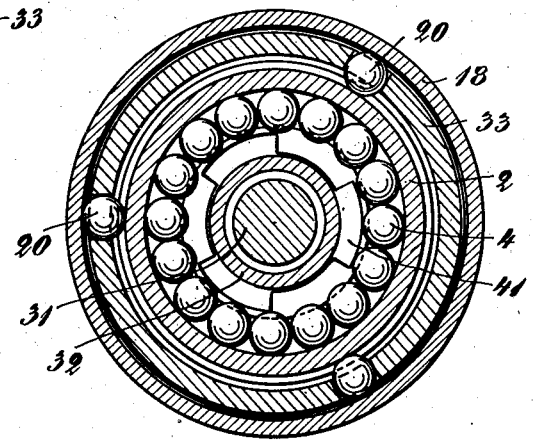
Inventor,
K. G. Östberg
By: Glascock Downing & Seebold
Attys.

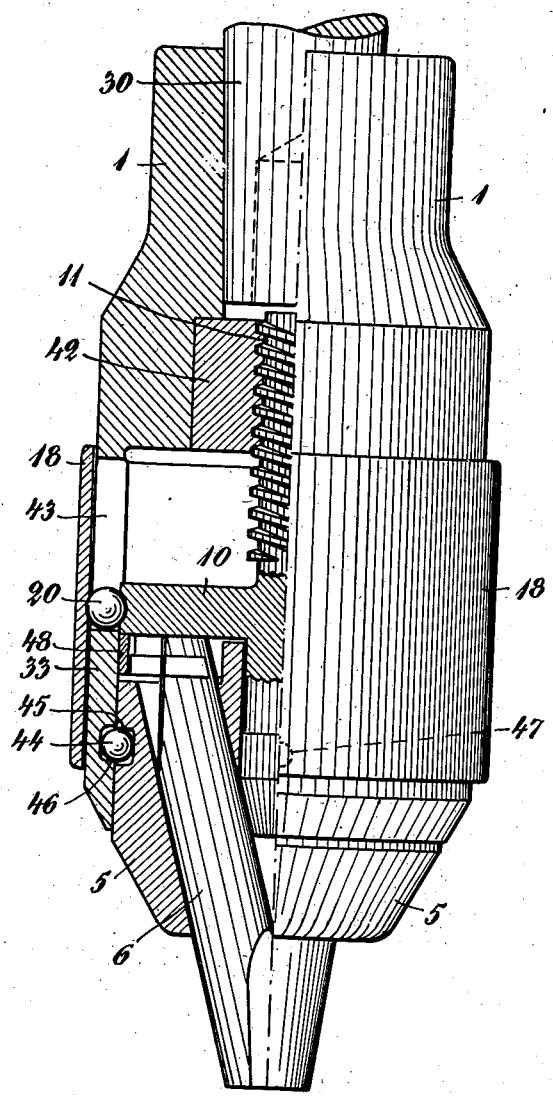

Patented Aug. 11, 1942

2,292,470

UNITED STATES PATENT OFFICE 2,292,470

ROTARY CLUTCHING DEVICE

Karl Gustaf Östberg, Stockholm, Sweden

Application March 6, 1940, Serial No. 322,628
In Sweden March 16, 1939

18 Claims. (Cl. 279—60)

The present invention relates to chucks or other rotary clutching devices of the kind which are provided with a shifting member adapted to be turned relatively to the main body of the device and thereby to shift the jaws or other gripping members of the device into and out of gripping position, the actuation of said shifting member being effected by means of an external hand operated setting ring or sleeve connected therewith.

It has been proposed to provide a drill chuck of this kind with an additional hand-operated setting sleeve connected with the shifting member through a motion reversing toothed gearing in order thereby to make it possible to perform the shifting operation in a convenient manner during rotation of the chuck. If this additional setting sleeve is slightly retarded during rotation by touching the same with the hand, the shifting member, owing to the reversing action of said gearing, will be turned relatively to the main body of the chuck in the direction of rotation thereby causing release of the drill actually inserted in the chuck whereupon a new one may be put in and secured in place by similar actuation of the first setting sleeve. The provision of a toothed gearing in a chuck, however, involves serious constructional difficulties and a considerable complication as well as an increase of the overall dimensions of the chuck.

An object of this invention is to avoid these difficulties and to equip the chuck with a reversing gearing of simple and reliable construction without noticeably increasing the dimensions of the chuck.

Another object of the invention is to eliminate the risk of the operator's hand being injured by the touch with the said additional setting sleeve when the chuck runs at a high speed.

A further object is to make it possible to accomplish the shifting operation as a whole by actuation of a single setting sleeve.

Further objects of the invention will be explained in the following description with reference to the accompanying drawings. Figure 1 illustrates a drill chuck according to one embodiment of the invention half in longitudinal section and half in side view. Figures 2, 3 and 4 are transversal sections on lines 2—2, 3—3 and 4—4 respectively in Figure 1. Figure 5 is an end view of the chuck in Figure 1 and Figure 6 shows a detail thereof. Figure 7 shows a second embodiment of a drill chuck the representation being similar to that in Figure 1. Figures 8 and 9 are transversal sections on lines 8—8 and 9—9 in Figure 7. Figure 10 is a detail. Figures 11 to 13 show a third embodiment, Figures 12 and 13 being sections on lines 12—12 and 13—13 in Figure 11, and Figure 14 is a representation, similar to Figures 1, 7 and 11 of a fourth embodiment.

According to the invention a motion reversing gearing connecting an additional setting sleeve with the shifting member of the chuck or the like comprises a number of balls or other rolling members clamped between circular races one of which is formed in said additional setting sleeve and the other of which is formed in a ring or the like connected with the shifting member of the chuck or the like.

In Figure 1 the reference numeral 1 indicates the main body of the chuck, said main body being intended to be thrust onto a taper mandrel not shown on the drawings. The lower end of the main body is surrounded by a sleeve 2 rotatably mounted thereon said sleeve having a milled external mantle surface and representing one of the hand-operated setting members. Between a flange 3 at the upper end of the sleeve 2 and a corresponding flange formed at the lower end of the main body are inserted balls 4 serving to take up axial pressure between the main body and the sleeve 2. A boss or chuck head 5 is screwed into the lower end of the sleeve and three cylindrical bars 6 are slidably mounted in outwardly converging bores in said chuck head, the outer ends 7 of said bars forming the gripping jaws of the chuck. Each of the bars 6 is formed at its upper or inner end with grooves or recesses and is engaged by means of said grooves in a radial slit 9 in a circular disc 10 actuated by a central screw 11. This screw which represents the shifting member proper is connected with the main body through the medium of an annular nut 12 screwed onto the shifting member and mounted in the main body in such manner as to be capable of turning around its axis for a certain angle determined by two stops. Between the annular nut 12 and the main body 1 are inserted balls 13 which are movable along sloping races 14 limited by projections 15 integral with the nut 12 and cooperating with projections 16 integral with the main body. In Figure 3 the nut 12 takes up one of its end positions in which each of the balls 13 is clamped in circumferential direction between one of the projections 15 of the nut 12 and one of the projections 16 of the main body and is wedged, on account of the sloping of the appertaining race 14, between the main body and the nut. If the nut 12 is turned in the clockwise direction in Figure 3 the balls are forced to the lowermost points of their races where a certain backlash in axial direction between the balls and the main body occurs. An elastic stop ring 17 engaging a circular groove at the top of the nut 12 retains the nut in place.

Underneath the nut 12 an elastic wire 29 bent in the form shown in Figure 6 is clasped between the screw 11 and a grooved annular flange at the lower end of the nut. This wire accordingly bears with elastic pressure against the screw threads and serves to bring about sufficient friction between the screw and the nut so that the nut moves together with the shifting member 11 at the beginning of the release movement of the latter which release movement takes place in the clockwise direction relatively to the main body and results in the jaws 6 being moved apart and the drill being released, while at the same time the balls 13 are moved against their slack or loosened positions. The provision of the nut 12 and the balls 13 serves to prevent the screw from sticking to the main body and thus to facilitate the release movement. If the screw 11 is made square threaded and with a pitch of 10° or more the nut 12 and the appertaining members may be dispensed with and the screw 11 may then instead be screwed directly into the main body as shown in Figures 7, 11 and 14.

Above the setting sleeve 2 a second sleeve 18 is mounted so as to be capable of being turned relatively to the main body and to the sleeve 2. The sleeve 18 is likewise provided with a milled mantle surface and represents the additional hand-operated setting member, or the releasing member of the chuck. Between an inward flange 19 on the sleeve 18 and the flange 3 of the setting sleeve 2 are clamped balls 20 loosely mounted in recesses in the edge of a ball ring 21 which surrounds the main body and is formed at its inner edge with projections 22, Figure 2, engaging longitudinal grooves in the main body. Axial pressure between the sleeve 18 and a press nut 24 screwed onto the main body is taken up by balls 23 inserted between the flange 19 and a ring 26 surrounding the main body. In order to obtain a suitable extent of axial pressure from the press nut 24 an elastic annular washer 27 is arranged between the nut 24 and the ring 26. The lower portion of the nut 24 projects downwardly inside the flange 19 and is slit up longitudinally from its lower edge at 28 into a number of elastic extensions which are bent inwardly before being threaded on the body 1 and serve to provide an efficient locking of the nut.

As will be understood from the above the balls 20 together with the ball ring 21 and the ball races formed in the flanges 3 and 19 constitute the motion reversing friction gearing interposed between the releasing member 18 and the shifting member 11. The mode of action of this gearing will be understood from the above and from a consideration of Figures 1 and 2. Obviously, if the release member 18 is turned the balls 20 will rotate in the recesses of the ball ring 21 and will transmit opposite turning movement to the sleeve 2 which, together with the screw 11 connected therewith will turn in an opposite direction.

If the chuck rotates in the usual direction and if the setting sleeve 2 is retarded by touching it with the hand the said sleeve will be turned relatively to the main body in such direction that the shifting member, or the left-handed screw 11, screws out to some extent. The bars 6 are thereby pushed downwardly their inner ends sliding in the radial slits 9 and their outer ends being moved together so as to be tightened around a drill inserted into the chuck. During the drilling operation power is transmitted from the main body through the annular nut 12 and the screw 11, the nut 12 then taking up the position shown in Figure 3 in which the balls 13, as stated above, are wedged between the nut and the main body.

If exchange of drill has to take place without stopping the chuck the release member 18 is retarded by touching it with the hand said release member then being turned in the counterclockwise direction relatively to the main body and imparting, through the medium of the motion reversing friction gearing 3, 19, 20, 21 opposite movement to the sleeve 2 which, together with the shifting member 11 is turned around the main body in the clockwise direction in Figure 3. The shifting member thereby screws into some extent and the jaws 7 are pulled inwardly in the chuck head 5 and moved apart to release the drill. The release is facilitated by the described arrangement of the annular nut 12 and the balls 13 inserted between the nut and the main body which balls at the beginning of the release movement of the shifting member 11 are moved down the sloping races 14 into their loosened positions. Jamming of the screw in the nut 12 is thereby prevented and the shifting is easily effected even if the screw 11 has a small pitch. After the new drill has been inserted between the jaws 7 and the sleeve 2 is retarded thereby causing the jaws to be tightened about the drill as described above.

In the embodiment according to Figure 7 as well as in the other embodiments described below the rolling members of the motion reversing gearing are clamped radially between rings or sleeves in which the appertaining races are formed. The outer race for the rolling members, which in all embodiments shown consist of balls 20, is formed on the inside of the annular releasing member 18. The inner race for the balls 20 is formed on the outside of the ring 2 which in this case is disposed inside the chuck. Balls 4 are arranged between the ring 2 and the main body 1 to take up axial pressure. The balls 20 are three in number and the setting ring 18 which is capable of elastic deformation has been applied in place by being subjected to external pressure at three points spaced apart by angular distances of 120° so that expansion of the ring is caused at intermediate points thereby allowing the ring to be passed over the balls and to exert radial clamping pressure thereon after the external pressure has ceased. The main body 1 is thrust upon a tapered mandrel 30 the lower end of which is formed with a square threaded and right-handed central screw 31 upon which a sleeve 32 is screwed. This sleeve, the upper end of which fits in the bore of the main body and which in this embodiment represents the shifting member of the chuck is made integral with the boss or chuck head 5. The latter fits in a cylindrical extension 33 of the main body. The shifting member screwed onto the screw 31 and comprising the portions 32 and 5 is thus rotatably mounted and guided at both ends in the main body. The cylindrical extension 33 is provided with radial holes 34 in which the balls 20 of the motion reversing friction gearing are disposed.

In contradistinction to the embodiment in Figure 1 the ring 2 is not fast with the chuck head 5 but is operatively connected therewith through the medium of the bars 6 which are slidably mounted in the chuck head 5 in similar manner as in Figure 1 and the upper T-formed ends 35 of which slidably engage corresponding radial grooves in the ring 2. As will be seen, the ring 2 is connected with the shifting member 5, 32 in such manner that the latter will partake in each turning movement of the ring 2 while, being capable of axial displacement in relation to the ring.

In an annular space formed between the setting sleeve 18 and the main body 1 is disposed a spiral spring 36, the inner end of which is connected at 37 to a split elastic ring 38 which has been forced over the top of the main body and has snapped into an annular recess so as to embrace the main body with a certain frictional power. The outer end of the spring 36 is connected at 39 to the setting ring 18.

If the setting ring 18 is retarded by the hand while the main body rotates with the mandrel 30 in the clockwise direction as seen from the top, the setting member will be turned in counter-clockwise direction relatively to the main body and this relative movement is transformed by the friction gearing comprising the balls 20 in an opposite turning movement of the ring 2 which, together with chuck head 5, then turns relatively to the main body in the rotary direction of the chuck. The shifting member, as the chuck head 5 together with the sleeve 32, is thereby displaced axially in a downward direction, the upper ends 35 of the bars 6 being forced to slide outwardly in the radial grooves of the ring 2. The lower ends of the bars 6 constituting the gripping jaws of the chuck are moved apart and the drill is released. While still touching the setting sleeve with one hand the operator can now insert a new drill and then removes his hand from the setting sleeve 18 whereupon the spring 36 that was tightened by the retardation of the setting sleeve 18 will now cause the latter to return. By this return movement an opposite movement is imparted to the shifting member 5, 32 which thereby screws up on the screw 31 again so that the jaws 7 are again moved together to grip the new drill.

In this embodiment, as will be seen from the above, the shifting operation may be accomplished by actuation of a single setting member, or the releasing member 18. However, the restoring spring 36 may, if desired, be dispensed with in which case the tightening of the jaws may be effected by grasping the protruding end of the chuck head 5 or touching it with the finger, said protruding end then serving as a second setting member corresponding to the sleeve 2 in Figure 1.

The embodiment according to Figure 11 differs from that shown in Figure 7 mainly in that the spring 36 serving to return the release member 18 is disposed inside the main body 1 around the sleeve 32 and is clasped axially between the ring 2 and projections 40 at the upper end of the sleeve 32. In order to enable the sleeve to be passed through the ring 2 when assembling the chuck the ring 2 is provided at its inner edge with notches 41 corresponding to the projections 40. The mode of action is the same as in Figure 7. When the setting ring 18 is retarded and the shifting member 5, 32 screws off the screw 31 to some extent the spring 36 will be compressed axially, and upon the operator then removing his hand from the setting ring after the exchange of drill the shifting member is forced back again by the spring power while turning around the screw 31.

In the embodiment according to Figure 14 the restoring spring 36 is dispensed with and the protruding lower end of the chuck head 5 is used in the manner stated above as a second setting member for tightening the jaws after exchange of drill. In other respects, the embodiment according to Figure 14 differs from those according to Figures 7 and 11 mainly in that the inner race for the balls 20 of the frictional gearing is formed at the circumference of a circular plate 10 integral with the shifting member 11. This latter consists of a central screw engaging an annular nut 42 that is thrust into a cylindrical recess in the main body and by suitable means is prevented from turning relatively to the main body. Since, in this case, the friction gearing as a whole including the balls 20 and the outer ball race formed in the setting ring 18 must be capable of axial displacement together with the shifting member 11 the holes or apertures provided for the balls 20 in the cylindrical extension 33 of the main body 1 are prolonged in an axial direction so as to form longitudinal slots 43. The upper ends of the bars 6 are formed in the same way as shown in Figure 10 and are in engagement with radial grooves in the bottom side of the plate 10.

The chuckhead 5 is rotatably mounted in the cylindrical extension 33 of the main body by means of balls 44 which are disposed in an annular channel composed of two circular grooves turned out in the inner circumference of the extension 33 and the outer circumference of the chuck head 5 respectively, said grooves being so formed that each ball bears against the walls of the grooves at points 45, 46 situated at the ends of an inclined diameter of the ball, the balls 44 being thus capable of taking up axial pressure. When assembling th chuck, the balls 44 are introduced into the channel through a hole 47 in the wall of the cylindrical extension 33. The reference number 38 designates a ring disposed under the edge of the plate 10 in order to limit the outward radial movements of the bars 6.

The invention is not restricted to chucks but may be used also in connection with other rotary clutching devices which are provided with gripping means mounted rotatably on a main body and adapted to be shifted from inoperative to operative position and vice versa by rotation relatively thereto.

I claim:

1. A chuck comprising in combination, a main body, gripping means rotatably mounted on said main body and adapted to be shifted from an inoperative to an operative position and vice versa by rotation relatively thereto, a hand operated setting ring coaxial with and rotatable in relation to the main body and also in relation to said gripping means, an intermediate circular member connected with the gripping means, a number of rolling members clamped between said setting ring and said intermediate member, said rolling members being mounted in recesses stationary in relation to the main body, thereby providing a reversing friction gearing between said setting ring and said gripping means so that rotation of the setting ring in one direction relatively to the main body will cause opposite rotation of said gripping means.

2. A chuck comprising in combination, a main body, a shifting member adapted to be displaced axially by rotation relatively to the main body, gripping members shiftable through axial displacement of said shifting member, a hand operated setting ring rotatable in relation to the main body, an intermediate circular member rotatable in relation to the main body and also in relation to said setting ring and connected with said shifting member, and rolling members clamped between said intermediate member and said setting ring, said rolling members being mounted in recesses stationary in relation to the main body, thereby providing a reversing friction gearing between the setting ring and the shifting member, so that roation of the setting ring in one direction relatively to the main body will cause the said shifting member to be rotated in opposite direction.

3. A chuck comprising in combination a main body, a shifting member adapted to be displaced axially by rotation relatively to the main body, a chuck head rotatable in relation to the main body, a number of bars mounted in outwardly converging bores in said chuck head so as to be slidable in their longitudinal directions, said bars being formed at their outer ends with gripping surfaces, means operatively connecting said bars with said shifting member so as to cause displacement of said bars in their longitudinal directions upon axial displacement of the shifting member, a hand operated setting ring rotatable in relation to the main body, an intermediate circular member likewise rotatable in relation to the main body and connected with said shifting member, rolling members clamped between said intermediate member and said setting ring, said rolling members being mounted in recesses stationary in relation to the main body, thereby providing a reversing friction gearing between the setting ring and the shifting member, so that rotation of the setting ring in one direction relatively to the main body will cause the said shifting member to be rotated in the opposite direction.

4. A chuck comprising in combination, a main body, a shifting member adapted to be displaced axially by rotation relatively to the main body, gripping members shiftable through axial displacement of said shifting member, a hand operated setting ring rotatable in relation to the main body, an intermediate annular member rotatable in relation to the main body and also in relation to said setting ring and connected with said shifting member, rolling members clamped between circular races formed in said setting ring and said intermediate annular member respectively, said rolling members being mounted in recesses stationary in relation to the main body, thereby providing a reversing friction gearing between the setting ring and the shifting member, so that rotation of the setting ring in one direction relatively to the main body will cause the said shifting member to be rotated in opposite direction.

5. A chuck head as claimed in claim 3, characterized in that the chuck head is fast with one of those annular members between which the rolling members are clamped and that the upper ends of said bars are engaged with radial grooves formed in the shifting member.

6. A chuck head as claimed in claim 3, characterized in that the chuck head is fast with the shifting member and that the upper ends of said bars are engaged with radial grooves formed in one of those annular members between which the rolling members are clamped.

7. A chuck as claimed in claim 3 in which the rolling members are clamped between the hand-operated setting ring and a disc-formed part of the shifting member, the upper ends of said bars being engaged with radial grooves formed in said disc-formed part.

8. A chuck as claimed in claim 4 in which the rolling members are clamped axially between said hand-operated setting member and said intermediate member.

9. A chuck as claimed in claim 4, in which the rolling members are clamped axially between said hand-operated setting member and said intermediate member by the action of a compressed elastic washer.

10. A chuck as claimed in claim 4, in which the rolling members are clamped radially between said hand operated setting member and said intermediate member.

11. A chuck as claimed in claim 4, in which the outer one of the annular members between which the rolling members are clamped is elastically expanded so as to exert radial clamping pressure on the balls.

12. A chuck as claimed in claim 4, in which the rolling members are three in number and the outer one of those annular members between which the rolling members are clamped is subjected to elastic deformation, being expanded at points right opposite the rolling members.

13. A chuck as claimed in claim 4 in which the rolling members consist of balls inserted in radial holes in a cylindrical extension of the main body.

14. A chuck comprising in combination, a main body, a shifting member adapted to be displaced axially by rotation relatively to the main body, gripping members shiftable through axial displacement of said shifting member, a hand operated setting ring rotatable in relation to the main body, a spring adapted to be tightened by rotation of said setting ring in one direction relatively to the main body and to restore said setting member after actuation thereof, an intermediate circular member rotatable in relation to the main body and also in relation to said setting ring and connected with said shifting member, rolling members clamped between circular races formed in said setting ring and said intermediate member respectively, said rolling members being mounted in recesses stationary in relation to the main body, thereby providing a reversing friction gearing between the setting ring and the shifting member, so that rotation of the setting ring in one direction relatively to the main body will cause the said shifting member to be rotated in opposite direction.

15. A chuck as claimed in claim 14 in which said spring is connected at one end with one of those annular members between which the rolling members are clamped and at its other end with the main body.

16. A chuck as claimed in claim 2 in which the shifting member consists of a sleeve engaging a central screw formed upon the end of a mandrel upon which the main body is thrust.

17. A chuck as claimed in claim 2 in which the shifting member is screwably connected with the main body and is guided therein at both ends.

18. A chuck as claimed in claim 2 in which the rolling members are clamped between the hand operated setting ring and a disc-formed part of the shifting member, the rolling members consisting of balls mounted in longitudinal slits in the main body, and the said setting ring being displaceable axially in relation to the main body.

KARL GUSTAF ÖSTBERG.